United States Patent [19]

Pulver et al.

[11] 3,910,406
[45] Oct. 7, 1975

[54] TWO-PART CLIP

[75] Inventors: W. O. Pulver, Hinsdale; Robert W. Owens, Blue Island, both of Ill.

[73] Assignee: Velten & Pulver, Inc., Chicago Ridge, Ill.

[22] Filed: Sept. 26, 1973

[21] Appl. No.: 400,952

[52] U.S. Cl. ............... 198/189; 198/195; 198/203
[51] Int. Cl.² ..................................... B65G 17/00
[58] Field of Search .......... 198/193, 195, 181, 182, 198/189, 203; 74/245 R, 245 C, 250 R, 250 C, 251 C; 59/93

[56] References Cited
UNITED STATES PATENTS

| | | | |
|---|---|---|---|
| 2,402,376 | 6/1946 | Dalrymple | 198/189 |
| 2,954,113 | 9/1960 | Hibbard et al. | 198/189 |
| 3,094,206 | 6/1963 | Stewart et al. | 198/189 |
| 3,338,380 | 8/1967 | Grebe | 198/189 |
| 3,651,924 | 3/1972 | Homeier et al. | 198/182 |
| 3,653,493 | 4/1972 | Kerr | 198/189 |
| 3,708,059 | 1/1973 | Ackermann | 198/189 |
| 3,711,161 | 1/1973 | Proctor et al. | 74/250 C |

*Primary Examiner*—Evon C. Blunk
*Assistant Examiner*—Joseph E. Valenza
*Attorney, Agent, or Firm*—Prangley, Dithmar, Vogel, Sandler & Stotland

[57] ABSTRACT

A two-part clip with each part having a base and a leg having a socket for receiving the outer end of a connecting pin of an articulated roller chain conveyor. A support surface is formed from a rod extending outwardly from the two-part clip which also serves to maintain the two-part clip together. The two-part clip may be provided with a drive engaging member to permit the articulated roller chain carrying the two-part clip to be driven by drive mechanism.

19 Claims, 19 Drawing Figures

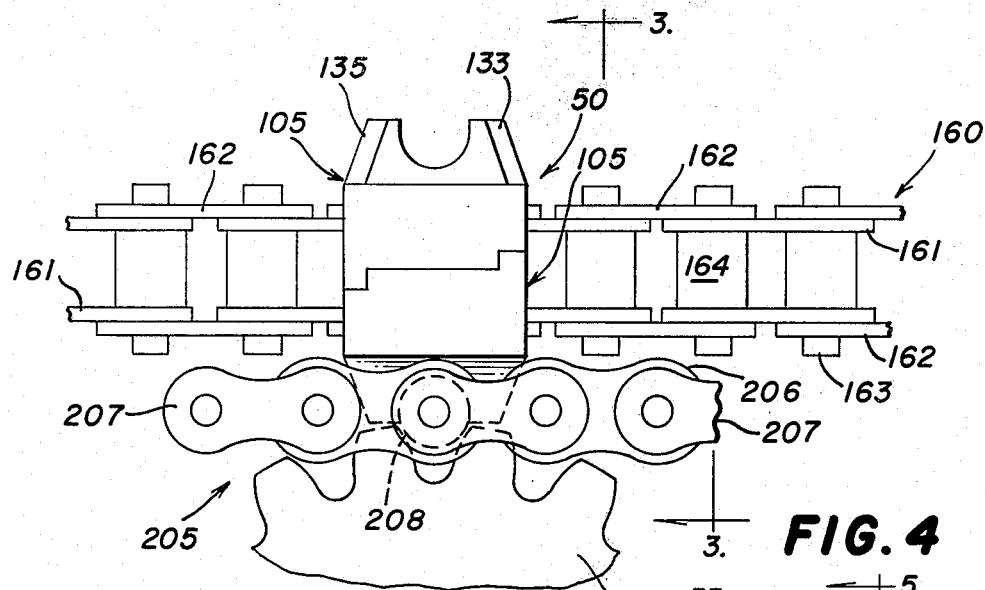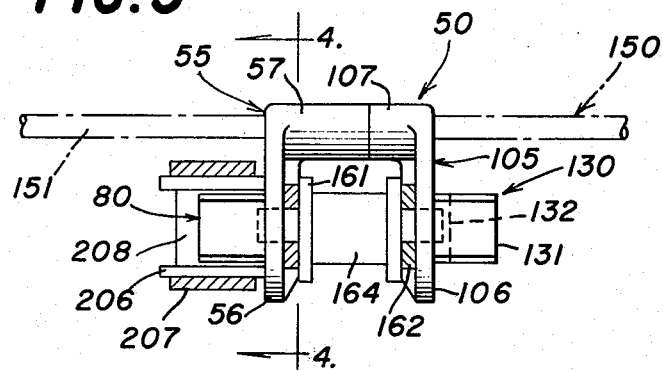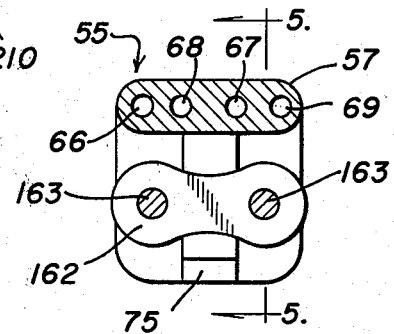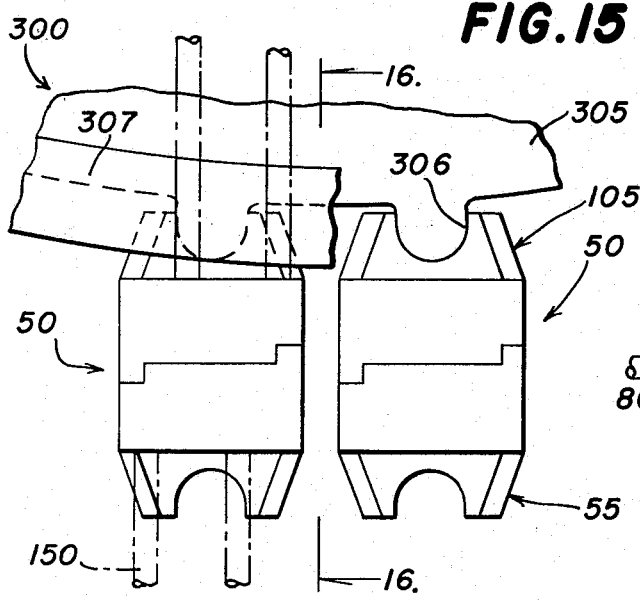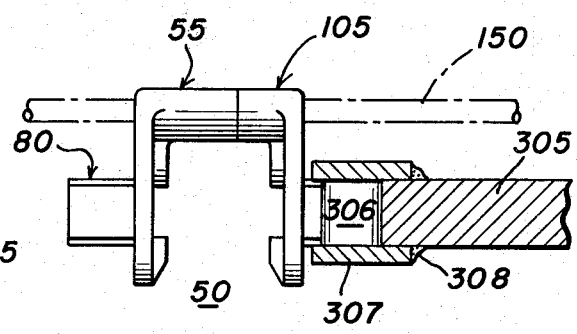

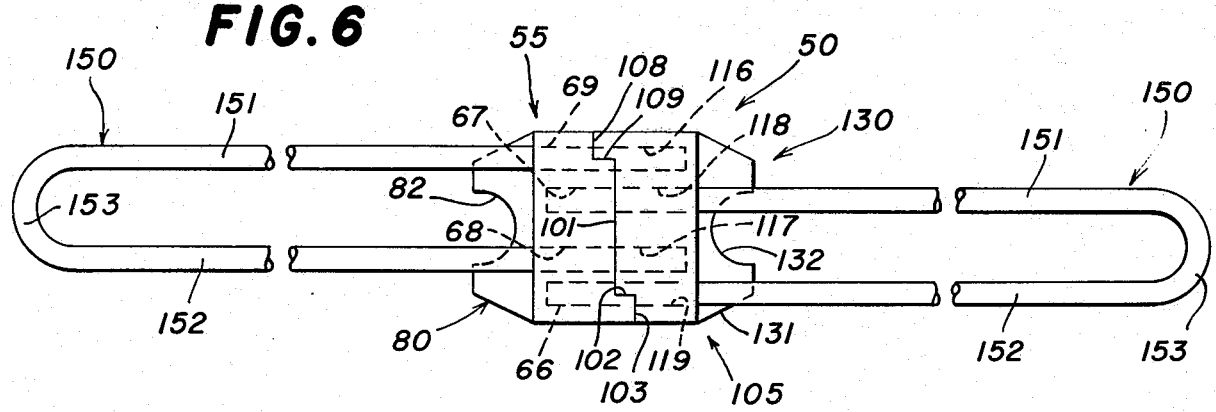
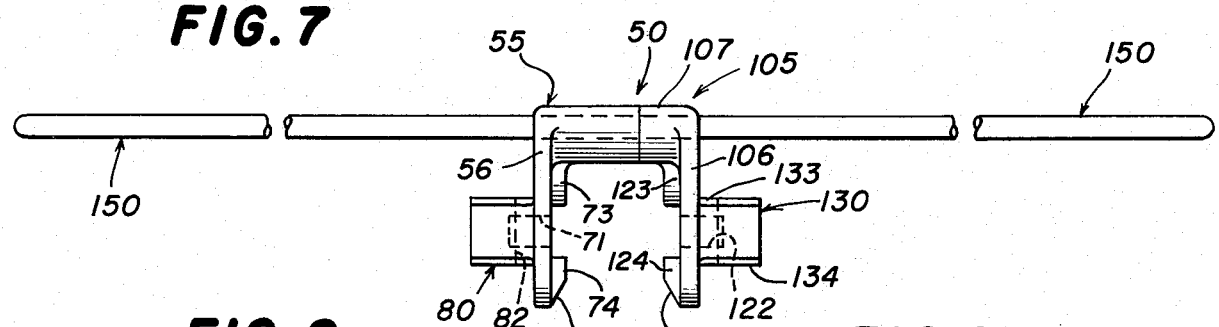
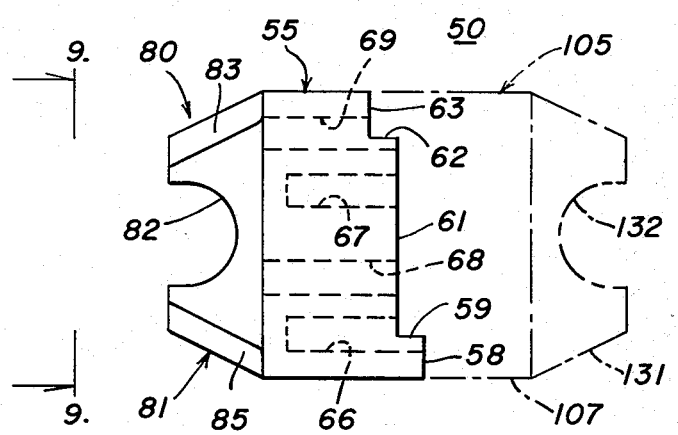
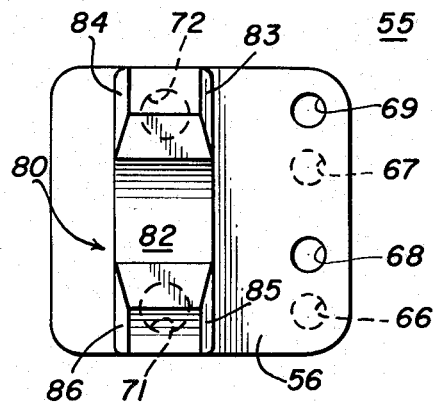
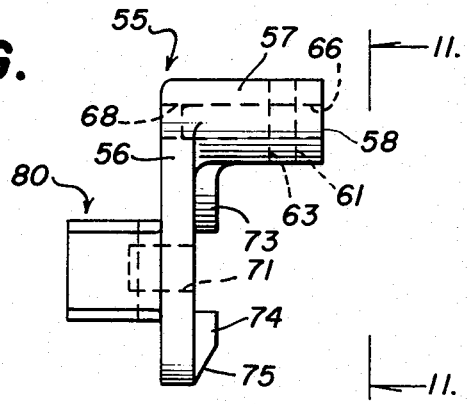
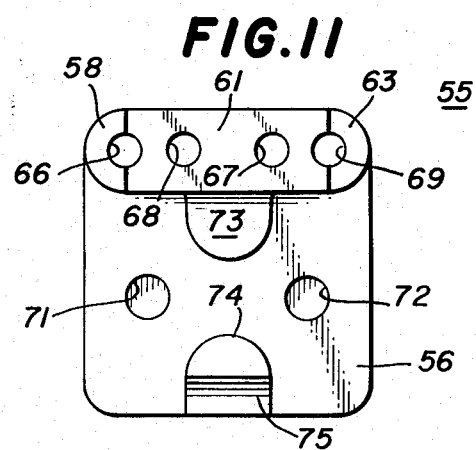

TWO-PART CLIP

This invention relates to a two-part clip for use with an articulated roller chain conveyor and more particularly to an assembly for providing a conveying surface for carrying goods and the like.

A general object of the present invention is to provide a two-part clip which may be used in an assembly to provide a support surface for carrying goods and the like and which may be used as part of a drive assembly for driving a roller chain conveyor.

An important object of the present invention is to provide an assembly for providing a support surface for carrying goods and the like on an articulated roller chain conveyor having a plurality of links joined together by connecting pins having the outer ends thereof protruding laterally beyond the links, the assembly comprising a two-part clip with each part having a base and a leg depending therefrom, each of the legs having an inner surface with a socket therein for receiving the outer end of an associated connecting pin, each of the bases having an aperture therein extending in a direction substantially normal to the associated leg, and a rod extending into the aligned apertures and outwardly from the bases to provide a support surface, the rod snugly fitting in the apertures and frictionally maintaining the bases together with the legs in engagement with the associated connecting pin, a plurality of the assemblies mounted on the roller chain providing a conveying surface for transporting articles.

Another object of the present invention is to provide an assembly of the type set forth in which a drive engaging member extends from each of the parts for cooperation with drive mechanism for driving the chain conveyor.

Another object of the present invention is to provide a clip part for use in an assembly providing a support surface of rods for carrying goods and the like on an articulated roller chain conveyor having a plurality of links joined together by connecting pins having the outer ends thereof protruding laterally beyond the links, wherein two of the clip parts are held in assembled relation on the chain conveyor by one of the rods, the clip part comprising a base and a leg depending therefrom, the leg having an inner surface with a socket therein for receiving the outer end of an associated connecting pin, the base having an aperture therein extending in a direction substantially normal to the leg for receiving an associated rod therein.

Yet another object of the present invention is to provide a drive assembly for use with an articulated roller chain conveyor having a plurality of links joined together by connecting pins having the outer ends thereof protruding laterally beyond the links, the drive assembly comprising a two-part clip with each part having a base and a leg depending therefrom, each of the legs having an inner surface with a socket therein for receiving the outer end of an associated connecting pin, a drive engaging member extending from each of the parts for cooperation with drive mechanism for driving the chain conveyor, and means for maintaining the bases of each two-part clip together with the legs in engagement with the associated connecting pin, a plurality of the assemblies mounted on the roller chain providing a drive connection between the chain conveyor and the drive mechanism to move the chain conveyor.

A further object of the present invention is to provide a conveyor system for carrying goods and the like comprising an articulated roller chain conveyor having a plurality of links joined together by connecting pins having the outer ends thereof protruding laterally beyond the links, a plurality of two-part clips mounted on the roller chain with each part having a base and a leg depending therefrom, each of the legs having an inner surface with a socket therein for receiving the outer end of the associated connecting pin, each of the bases having an aperture therein extending in a direction substantially normal to the associated leg, a drive engaging member extending from each of the parts of each two-part clip, and a rod extending into the aligned apertures and outwardly from the bases to provide a support surface, the rod snugly fitting in the apertures and frictionally maintaining the bases together with the legs in engagement with the associated connecting pin, and drive mechanism for cooperating with the drive engaging members of the two-part clips for driving the roller chain conveyor to transport articles.

A still further object of the present invention is to provide a conveyor system of the type set forth wherein a powered articulated roller chain conveyor with the rollers thereof is positioned to come into engagement with the drive engaging members of the two-part clips for driving the roller chain conveyor having the two-part clips thereon to transport articles.

A still further object of the present invention is to provide a conveyor system of the type set forth wherein a rotating disk having a plurality of teeth on the periphery thereof is positioned to contact the drive engaging members of the two-part clips to drive the roller chain conveyor to transport articles.

A final object of the present invention is to provide an assembly of the type set forth wherein a recess shaped complementary to the outer link of an associated articulated roller chain conveyor is carried in the inner surface of each leg of the two-part clip to receive therein the outer link of the associated conveyor.

These and other objects of the present invention together with further objects and advantages thereof will best be understood by reference to the following specification taken in connection with the accompanying drawings wherein:

FIG. 2 is an enlarged elevational view showing the cooperation of the drive chain with the two-part clip of the present invention;

FIG. 3 is an end elevational view partly in section of the two-part clip illustrated in FIG. 2, taken along lines 3—3 thereof showing the support rod in phantom;

FIG. 4 is an end elevational view partly in section of the two-part clip shown in FIG. 3 taken along lines 4—4 thereof;

FIG. 5 is a sectional view of the two-part clip illustrated in FIG. 4 taken along lines 5—5 thereof showing the connecting pin of the roller conveyor in elevation;

FIG. 6 is a plan elevational view of the two-part clip showing the combination therewith of a rod support which holds the two-part clip together;

FIG. 7 is a side elevational view of the two-part clip shown in FIG. 6;

FIG. 8 is an enlarged elevational view of the two-part clip shown in FIG. 6 without the support rods;

FIG. 9 is an end elevational view of the two-part clip shown in FIG. 8 as viewed along lines 9—9 thereof;

FIG. 10 is a side elevational view of the two-part clip shown in FIG. 8;

FIG. 11 is an end elevational view of the two-part clip shown in FIG. 10 as seen along lines 11—11 thereof;

FIG. 15 is an enlarged view of a portion of the conveyor system shown in FIG. 14, particularly illustrating the cooperation between the two-part clip and the driving disk; and FIG. 16 is an end elevational view partly in section of the two-part clip and drive mechanism shown in FIG. 15 viewed along lines 16—16 thereof.

Figure 1:
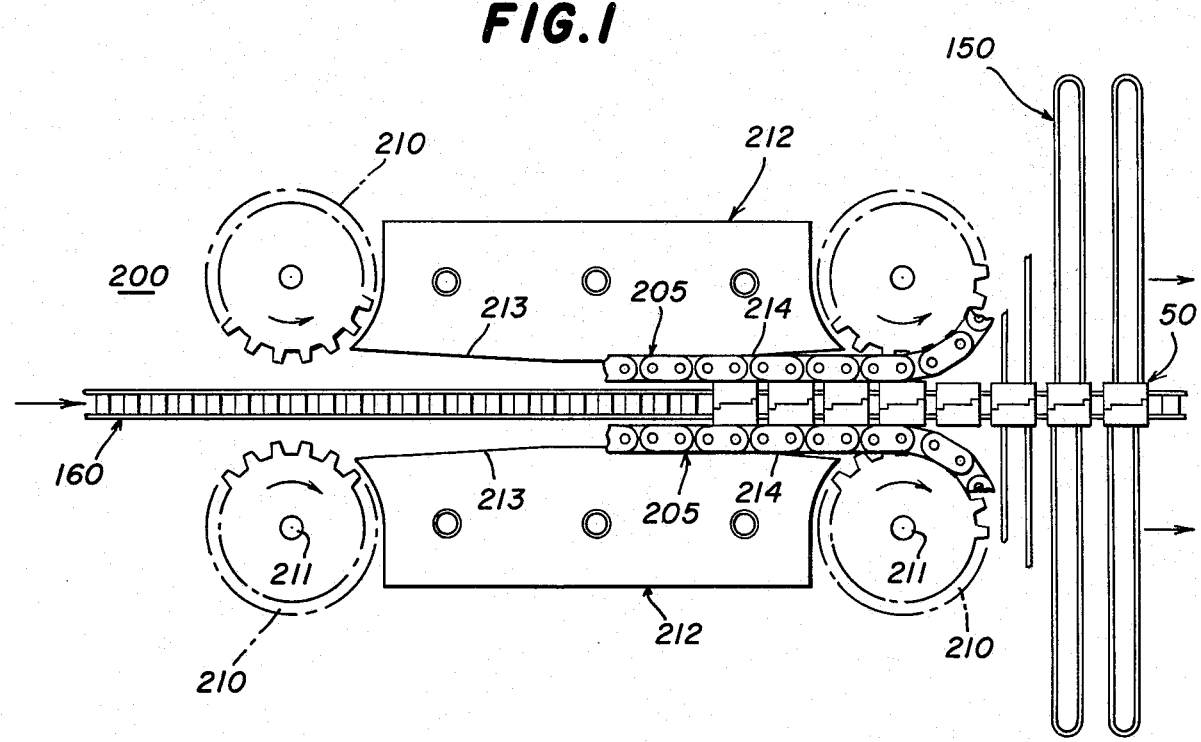
FIG. 1 is an elevational view of the conveyor system of the present invention particularly showing a conveyor belt drive mechanism in combination with the conveyor carrying the two-part clips and support rods.

Referring now to the drawings and more particularly to FIGS. 1 through 13 thereof, there is disclosed a two-part clip 50 which includes a first part 55 having a leg 56 and a base or leg 57 substantially normal thereto. The base 57 has a stepped end surface which includes a surface 58 parallel to the leg 56, a surface 59 perpendicular to the leg 56, a surface 61 parallel to the surface 58, a surface 62 parallel to the surface 59, and a surface 63 parallel to the surfaces 58 and 61. The base 57 of the first part 55 is provided with a plurality of spaced apart cylindrical apertures therein, a cylindrical aperture 66 extending part way through the leg 57 is provided at the juncture between the surfaces 58, 59 and 61. A cylindrical aperture 68 extending through the base 57 is spaced from the aperture 66. A second aperture 67 extending part way through the leg is provided in the end surface 61 and extends toward the leg 56 to the same extent as the aperture 66. Finally, a cylindrical aperture 69 is provided at the juncture between the surfaces 61, 62 and 63, the aperture extending entirely through the base 57 in the same manner as the aperture 68.

The inner surface of the leg 56 is provided with two spaced apart cylindrical sockets 71 and 72, each for a purpose hereinafter set forth. A rib 73 is positioned above the sockets and extends upwardly toward the base 57. Similarly, a rib 74 is vertically spaced from the rib 73 and extends toward the distal end of the leg 56, the rib 74 being provided with a beveled end surface 75.

A bifurcated drive engaging member 80 on the leg 56 extends outwardly therefrom in a direction substantially parallel to the base 57. The member 80 is in the form of a bifurcated frusto-wedge having a drive engaging recess 82 therein. Tapered surfaces 83, 84, 85 and 86 are provided at the ends of the wedge 81 in order that the member 80 fits with the driving member as hereinafter set forth. The leg 56 and the base 57, the ribs 73 and 74 and the member 80 are preferably molded as one piece and polypropylene is the preferred synthetic organic resin, although other resins are acceptable.

The two-part clip 50 includes a second part 105 constructed substantially identical to the first part 55, the second part 105 including a leg 106 positioned substantially normal to a base 107 connected thereto. The base 107 like the base 57 is provided with stepped end surfaces 108, 109, 111, 112 and 113 arranged identically with the end surfaces 58, 59, 61, 62 and 63, respectively. It is seen, therefore, that mating of the first part 55 with the second part 105 will provide a U-shaped two-part clip 50 as shown. The base 107 is also provided with two spaced apart cylindrical apertures 116 and 117 which extend part way through the base 107, and two spaced apart cylindrical apertures 118 and 119 which extend all the way through the base 107. As seen particularly in FIG. 6, the cylindrical aperture 69 is in registry with the cylindrical aperture 116, and the cylindrical aperture 67 is in registry with the cylindrical aperture 118, and the cylindrical aperture 68 is in alignment with the cylindrical aperture 117, and the cylindrical aperture 66 is in alignment with the cylindrical aperture 119 when the first part 55 and the second part 105 are mated to provide the two-part clip 50.

The second part 105 and more particularly the leg 106 thereof is provided with a rib 123 and a rib 124 vertically spaced from the rib 123, the rib 124 being provided with a beveled surface 125. A drive engaging member 130 is mounted on the side of the leg 106 opposite the ribs 123 and 124 and is a bifurcated frusto-wedge shaped body 131 having a recess 132 therein. The member 130 is provided with tapered surfaces 133, 134 and 135 and another tapered surface not shown to correspond with the tapered surfaces of the member 80. The second part 105 including the member 130 is preferably molded as one piece of a synthetic organic resin, such as polypropylene.

The two-part clip 50 is held together, and more specifically, the bases 57 and 107 are maintained in abutting relationship by elongated rods 150. Each of the rods 150 is U-shaped with legs 151 and 152 interconnected by a bight 153. As seen particularly in FIG. 6, one of the rods 150 extends through the apertures 68 and 69 of the part 55 and into the aligned apertures 116 and 117, respectively, of the part 105. Similarly, the other rod 150 extends through the apertures 117 and 118 in the part 105 and into the aligned apertures 66 and 67, respectively, in the part 55 thereby frictionally to maintain together the parts 55 and 105 to provide the U-shaped two-part clip 50.

The two-part clip 50 may be joined together by means other than the elongated rods 150. For instance, stub rods may be inserted into the aligned apertures of the parts, or the parts 55 and 105 simply may be welded one to the other. The two-part clip 50 without the rods 150 is useful as a drive assembly for use with an articulated roller chain conveyor 160, as shown in FIGS. 1 and 3, which comprises inner links 161 and outer links 162 mounted on connecting pins 163 extending beyond the outer links and joined to a roller 164. The two-part clip 50 may be mounted on the conveyor chain 160 as shown with the connecting pins 163 being received in the appropriate sockets 71 and 72 in the part 55 and the corresponding sockets in the part 105. Since the two-part clip 50 is preferably made of a synthetic organic resin such as polypropylene, the clip has sufficient resilience to accommodate a snap mounting onto the conveyor chain 160. Once the two-part clips 50 are mounted onto the conveyor chain 160, drive mechanism may be used in conjunction with the clips 50 to drive the conveyor chain 160.

The assembly consisting of the two-part clip 50 and the elongated rods 150 is useful for providing a support surface to transport articles when used in conjunction with the articulated roller chain conveyor 160. The rods 150 extending outwardly from the two-part clip 50 provide a laterally extending support surface which may accommodate a variety of articles while the two-part clip 50 provides a base for the rods 150 and provides means by which the roller chain 160 may be connected to drive mechanism.

Referring to FIG. 1, there is shown one such drive mechanism 200 in the form of two articulated roller chain conveyors 205 positioned perpendicularly to the roller chain conveyor 160. Each of the roller chain conveyors 205 includes inner links 206 and outer links 207 interconnected by rollers 208. Each of the roller chain conveyors 205 is mounted for movement in a closed loop around two spaced apart sprockets 210 each mounted on a shaft 211 powered by means not shown such as an electric motor. The roller chains 205 each pass over a guide plate 212 having ramps 213 and 214 which guide the roller chain 205 to be in position where the rollers 208 thereof will come into contact with the bifurcated drive engaging mechanism 80 and 130 extending outwardly from each of the two-part clips 50. With the sprockets 210 being driven in the direction of the arrows in FIG. 1, the conveyor 160, the two-part clips 50 and the rods 150 extending therefrom move to the right in FIG. 1, thereby to convey articles on the rods 150 along the path of the conveyor 160. The ramps 213 and 214 of the guide plates 212 insure contact between the rollers 208 of the drive chains 205 and the drive engaging members 80 and 130 of the two-part clips 50. The ribs 73, 74, 123 and 124 of the individual parts 55 and 105, respectively, provide shear strength to the two-part clip 50 to prevent fracture of each part during the driving thereof by the associated drive chains 205. More particularly, it is seen that each of the ribs 73, 74, 123 and 124 is in contact with the associated roller 164 of the conveyor chain 160 when the two-part clip is assembled and mounted on the conveyor. The beveled end surfaces 75 and 125 of the ribs 74 and 124 respectively provide the necessary clearance. Similarly, the beveled surfaces 81, 82, 83 and 84 of the drive engaging member 80 and the beveled surfaces 133, 134 and 135 of the member 130 insure a proper fit with the associated drive chain 205.

Figure 12:
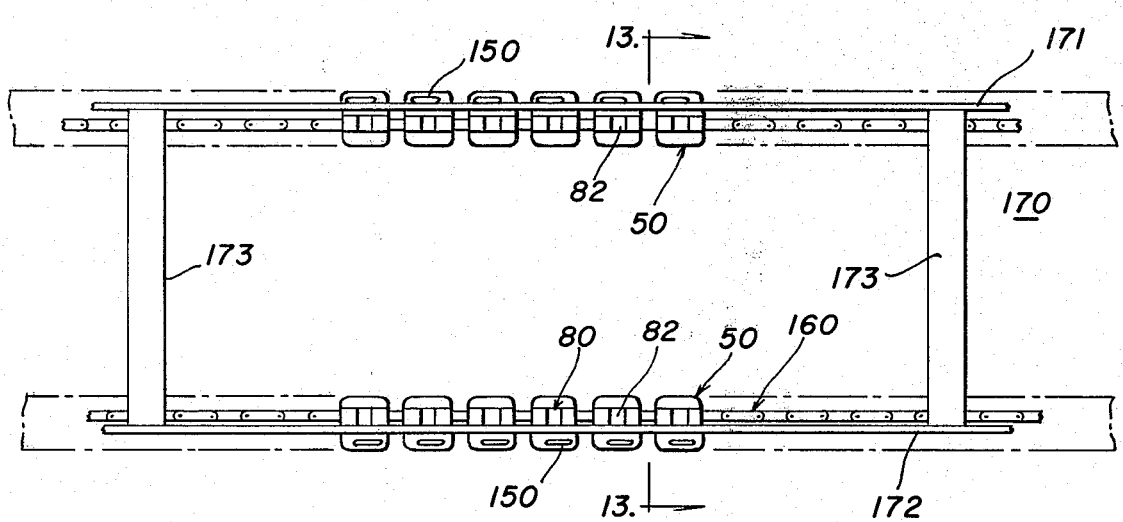
FIG. 12 is a side elevational view of the support structure for the roller conveyor shown in FIG. 1, particularly showing the drive engaging member as a support for the return reach of the conveyor.
Figure 13:
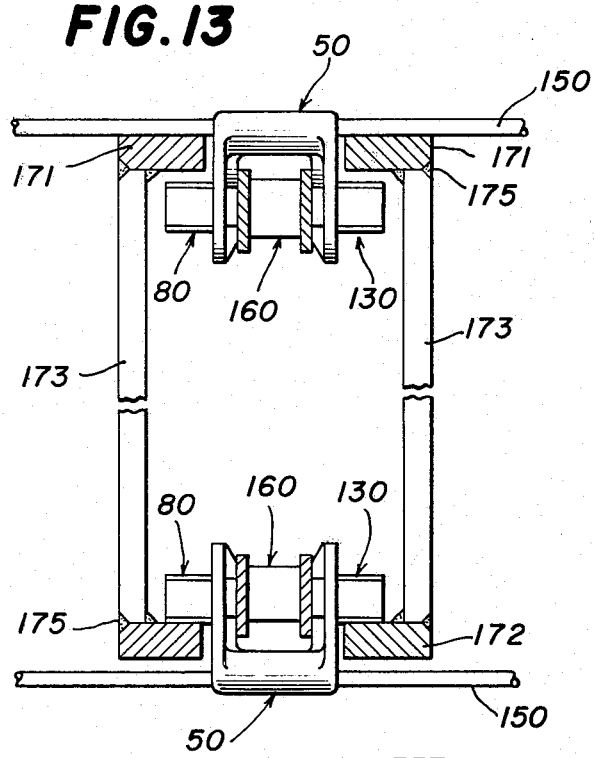
FIG. 13 is an end elevational view of the roller conveyor and support structure therefor illustrated in FIG. 12 as viewed along lines 13—13 thereof.

Referring specifically to FIGS. 12 and 13, there is shown the support structure 170 for the conveyor 160, which support structure includes spaced apart upper frame members 171 extending along the longitudinal upper reach of the conveyor 160 and spaced apart lower frame members 172 parallel to and vertically spaced below respective ones of the upper frame members 171. The upper frame members 171 and the lower frame members 172 are interconnected by spaced apart vertically extending posts 173, each connected to the associated frame members 171 and 172 by weldments 175. As seen in FIG. 13, the elongated rods 150 rest on the upper frame members 171 to provide support for the two-part clip 50 and the associated roller conveyor 160 along the upper reach of the conveying path. On the return reach of the conveying path, the drive engaging members 80 and 130 of each two-part clip 50 rest upon the lower support members 172 and serve as guides for the conveyor 160 carrying the clips 50 and support rods 150 thereon. When the conveyor 160, and the two-part clips 50 and the support rods 150 interconnecting the clips are used to transport food articles, the use of the drive engaging members 80 and 130 as support guides enable the support rods 150 to be spaced from the lower frame members 172 of the support structure 170, thereby permitting food particles to drop from the rods 150 and preventing contamination thereof. The support and guide feature of the drive engaging members 80 and 130 of each two-part clip 50 enables the conveyor 160 to be operated under more sanitary conditions than heretofore possible, a particularly important advantage in the transportation of food for commercial use.

Figure 14:
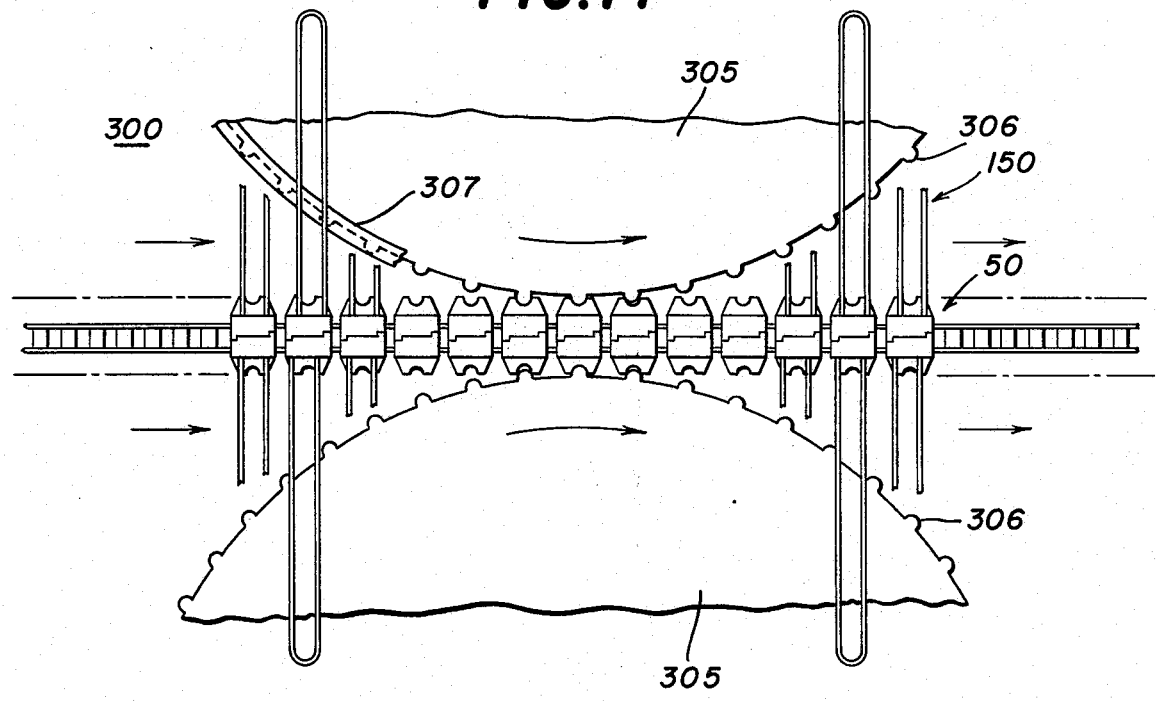
FIG. 14 is an elevational view of the conveyor system of the present invention showing the combination of a disk drive with the roller chain belt and two-part clips carried thereby.

Another drive mechanism 300 for the present invention is shown in FIGS. 14 through 16 and includes a rotating disk 305 with a plurality of spaced apart teeth 306 on the periphery thereof. An annular guard ring 307 is positioned on the opposed flat surfaces of the disk 305 and extends outwardly beyond the teeth 306, the guard rings 307 being fixedly welded to the disk 305 as at 308. The guard rings 307 insure proper contact between the teeth 306 and the associated drive engaging member 80 or 130 of the two-part clip 50.

It is seen, therefore, that the conveyor 160 in combination with the two-part clip 50 and the rods 150 may be driven by mechanism 200 or 300 to provide a conveying system wherein articles are transported along a predetermined path defined by the conveyor 160. Both conventional articulated roller chain conveyors or disk drive mechanism may be used in cooperation with the two-part clip 50 to drive the conveyor 160.

Figure 19:
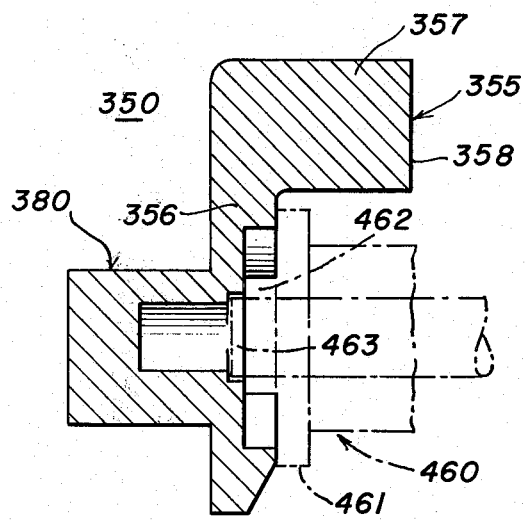
FIG. 19 is a sectional view of the part shown in FIG. 18 taken along lines 19—19 thereof.
Figure 17:
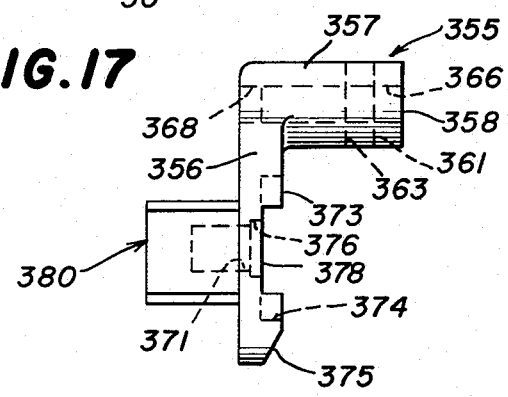
FIG. 17 is a side elevational view of one part of a second embodiment of the two-part clip of the present invention.
Figure 18:
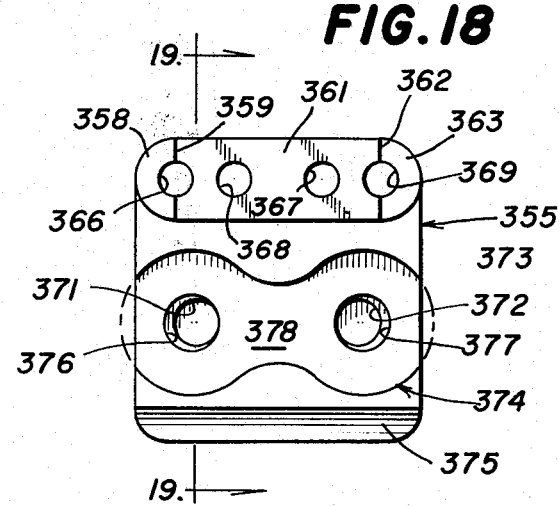
FIG. 18 is an end elevational view of the embodiment shown in FIG. 17.

Referring now to FIGS. 17 to 19 of the drawings, there is shown a second embodiment 350 of the two-part clip which includes a first part 355 (the second part is not shown for the sake of brevity but is identical to the first part) having a leg 356 and a leg 357 substantially normal to the leg 356. The leg or base 357 has a stepped end surface which includes a surface 358 parallel to the leg 356, a surface 359 perpendicular to the leg 356, a surface 361 parallel to the surface 362 parallel to the surface 359, and a surface 363 parallel to the surfaces 358 and 361. The base 357 of the part 355 is provided with a plurality of spaced apart cylindrical apertures therein, a cylindrical aperture 366 extending part way through the leg or base 357 is provided at the juncture between the surfaces 358 and 359 and 361. A cylindrical aperture 368 extending through the base 357 is spaced from the aperture 356. A second aperture 367 extending part way through the leg 357 is provided in the end surfaces 361 and extends toward the leg 356 to the same extent as the aperture 366. Finally, a cylindrical aperture 369 is provided at the juncture between the surfaces 361, 362 and 363, the aperture 369 extending entirely through the base 357 in the same manner as the aperture 368.

The inner surface 373 of the leg 356 is provided with a recess 374 shaped complementary to an outer link in an associated articulated roller chain conveyor such as the chain conveyor 160 to provide a surface 378 offset with respect to the surface 373. Two spaced apart cylindrical sockets 371 and 372 are provided in the surface 378 to receive an associated one of the connecting pins of the roller chain conveyor. An eccentric countersunk hole 376 and 377 is provided for each of the sockets 371 and 372, respectively. The inner surface 373 of the leg 356 intermediate the recess 374 and the leg or base 357 contacts the associated roller chain to provide support therefor in the same manner as the rib 73 in the first embodiment 50 of the two-part clip. Similarly, the part of the inner surface 373 intermediate the recess 374 and the tapered portion 375 of the leg 356 contacts the associated roller chain and provides support therefor in the same manner of the rib 74 of the first embodiment 50.

A bifurcated drive engaging member 380 on the leg 356 extends outwardly therefrom in a direction substantially parallel to the base or leg 357. The member 380 is similar in shape as the previously described member 80 and performs the same functions in the same manner and is preferably made out of a polypropylene synthetic organic resin. It is understood that a second part of the two-part clip 350 identical in shape is provided and is interconnected to the first part 355 by an associated support rod not shown. The principle difference between the embodiment 50 of the two-part clip and the two-part clip 350 just described is in the recess 374 shaped complementary to the associated link in the roller chain conveyor such as that shown in phantom and labeled 460 in FIG. 19. The conveyor 460 like the conveyor 160 includes an outer link 462 which resides in the recess 374 thereby to obviate the necessity for the extended connecting pin 163 previously described in connection with the conveyor 160. The connecting pin 463 of the conveyor 460 extends beyond the associated outer link 462 a distance sufficient to be seated in the countersunk apertures 376 and 377 thereby drivingly to interconnect the conveyor 460 with the associated two-part clip 350. The provision of the countersunk apertures 376 and 377 enables the two-part clip 350 to be used with articulated roller chain conveyors of standard construction such as conveyor 460 while the provision of the cylindrical sockets 371 and 372 enable the two-part clip 350 to be used with articulated roller chain conveyors such as the conveyor 160 hereinbefore described having the extended pins 163.

Summarizing, there has been provided two embodiments of a two-part clip useful in a drive assembly for mounting on an articulated roller chain conveyor to provide a drive connection between the conveyor and drive mechanism. The two-part clip in combination with the support rods provides an assembly carrying goods and the like on an articulated roller chain conveyor. The combination of the drive mechanism, the two-part clips, the rod supports and the conveyor provides a conveying system for transporting articles and the like.

While there has been described what is at present considered to be the preferred embodiment of the present invention, it will be understood that various modifications and alterations may be made herein without departing from the true spirit and scope of the present invention, and it is intended to cover in the appended claims all such modifications and alterations as fall within the true spirit and scope of the present invention.

What is claimed is:

1. An assembly for providing a support surface for carrying goods and the like on an articulated roller chain conveyor having a plurality of links joined together by connecting pins having the outer ends thereof protruding laterally beyond the links, said assembly comprising a two-part clip with each part having a base and a leg depending therefrom, each of said legs having an inner surface with a socket therein for receiving the outer end of an associated connecting pin, each of said bases having an aperture therein extending in a direction substantially normal to the associated leg, and a rod extending into the aligned apertures and outwardly from said bases to provide a support surface, said rod snugly fitting in said apertures and frictionally maintaining said bases together with said legs in engagement with the associated connecting pin, a plurality of said assemblies mounted on the roller chain providing a conveying surface for transporting articles.

2. The assembly set forth in claim 1, wherein each leg has two spaced apart sockets therein for receiving the outer ends of two connecting pins.

3. The assembly set forth in claim 1, wherein each base has two spaced apart apertures therein extending therethrough in a direction substantially normal to the associated leg.

4. The assembly set forth in claim 1, wherein each base has at least one aperture therein extending therethrough in a direction substantially normal to the associated leg and at least one aperture therein extending part-way through said base in a direction substantially normal to the associated leg.

5. The assembly set forth in claim 1, wherein said rod is U-shaped and extends through one of said bases and into the other of said bases.

6. The assembly set forth in claim 1 and further including a rib mounted on the inner surface of each of said legs positioned to be in contact with the associated link of the roller chain to provide additional strength to the two-part clip.

7. The assembly set forth in claim 1, wherein each part of said two-part clip is constructed of a synthetic organic resin.

8. An assembly for providing a support surface for carrying goods and the like on an articulated roller chain conveyor having a plurality of links joined together by connecting pins having the outer ends thereof protruding laterally beyond the links, said assembly comprising a two-part clip with each part having a base and a leg depending therefrom, each of said legs having an inner surface with a socket therein for receiving the outer end of an associated connecting pin, a drive engaging member extending from each of said parts for cooperation with drive mechanism for driving the chain conveyor, each of said bases having an aperture therein extending in a direction substantially normal to the associated leg, and a rod extending into the aligned apertures and outwardly from said bases to provide a support surface, said rod snugly fitting in said apertures and frictionally maintaining said bases together with said legs in engagement with the associated connecting pin, a plurality of said assemblies mounted on the roller chain providing a conveying surface for transporting articles in response to actuation of the drive mechanism cooperating with said drive engaging members to move the chain conveyor.

9. The assembly set forth in claim 8, wherein each drive engaging member is mounted on the leg of the associated clip bar and extends from the outer surface of said leg.

10. The assembly set forth in claim 8, wherein said drive engaging member bifurcated and receives a drive member therebetween for driving the chain conveyor.

11. A clip part for use in an assembly providing a support surface of rods for carrying goods and the like on an articulated roller chain conveyor having a plurality of links joined together by connecting pins having the outer ends thereof protruding laterally beyond the links, wherein two of the clip parts are held in assembled relation on the chain conveyor by one of the rods, said clip part comprising a base and a leg depending therefrom, said leg having an inner surface with a socket therein for receiving the outer end of an associated connecting pin, said base having an aperture therein extending in a direction substantially normal to said leg for receiving an associated rod therein.

12. The clip part set forth in claim 11, and further including a rib mounted on the inner surface of said leg positioned to be in contact with the associated link of the roller chain to provide additional strength to the clip part.

13. A drive assembly for use with an articulated roller chain conveyor having a plurality of links joined together by connecting pins having the outer ends thereof protruding laterally beyond the links, said drive assembly comprising a two-part clip with each part having a base and a leg depending therefrom, each of said legs having an inner surface with a socket therein for receiving the outer end of an associated connecting pin, each of said bases having an aperture therein extending in a direction substantially normal to said leg, a drive engaging member extending from each of said parts for cooperation with drive mechanism for driving the chain conveyor, and rod means in said apertures for maintaining said bases of each two-part clip together with the legs in engagement with the associated connecting pin, a plurality of said assemblies mounted on the roller chain providing a drive connection between the chain conveyor and the drive mechanism to move the chain conveyor.

14. The drive assembly set forth in claim 13, wherein each drive engaging member is mounted on the leg of the clip part and extends outwardly from the clip when the clip parts are assembled.

15. The drive assembly set forth in claim 13, wherein said drive engaging member bifurcated and receives a drive member therebetween for driving the chain conveyor.

16. A conveyor system for carrying goods and the like comprising as articulated roller chain conveyor having a plurality of links joined together by connecting pins having the outer ends thereof protruding laterally beyond the links, a plurality of two-part clips mounted on the roller chain with each part having a base and a leg depending therefrom, each of the legs having an inner surface with a socket therein for receiving the outer end of the associated connecting pin, each of said bases having an aperture therein extending in a direction substantially normal to the associated leg, a drive engaging member extending from each of said parts of each two-part clip, and a rod extending into the aligned apertures and outwardly from said bases to provide a support surface, said rod snugly fitting in said apertures and frictionally maintaining said bases together with said legs in engagement with the associated connecting pin, and drive mechanism for cooperating with the drive engaging members of the two-part clips for driving the roller chain conveyor to transport articles.

17. A conveyor system for carrying goods and the like comprising an articulated roller chain conveyor having a plurality of links joined together by connecting pins having the outer ends thereof protruding laterally beyond the links, a plurality of two-part clips mounted on the roller chain with each part having a base and a leg depending therefrom, each of the legs having an inner surface with a socket therein for receiving the outer end of the associated connecting pin, each of said bases having an aperture therein extending in a direction substantially normal to the associated leg, a drive engaging member extending from each of said parts of each two-part clip, and a rod extending into the aligned apertures and outwardly from said bases to provide a support surface, said rod snugly fitting in said apertures and frictionally maintaining said bases together with said legs in engagement with the associated connecting pin, and a powered articulated roller chain conveyor with the rollers thereof positioned to come into engagement with the drive engaging members of the two-part clips for driving the roller chain conveyor having the two-part clips thereon to transport articles.

18. A conveyor system for carrying goods and the like comprising an articulated roller chain conveyor having a plurality of links joined together by connecting pins having the outer ends thereof protruding laterally beyond the links, a plurality of two-part clips mounted on the roller chain with each part having a base and a leg depending therefrom, each of the legs having an inner surface with a socket therein for receiving the outer end of the associated connecting pin, each of said bases having an aperture therein extending in a direction substantially normal to the associated leg, a drive engaging member extending from each of said parts of each two-part clip, and a rod extending into the aligned apertures and outwardly from said bases to provide a support surface, said rod snugly fitting in said apertures and frictionally maintaining said bases together with said legs in engagement with the associated connecting pin, and a rotating disk having a plurality of teeth on the periphery thereof positioned to come into contact with the drive engaging members of the two-part clips to drive the roller chain conveyor to transport articles.

19. An assembly for providing a support surface for carrying goods and the like on an articulated roller chain conveyor having a plurality of links joined together by connecting pins having the outer ends thereof protruding laterally beyond the links, said assembly comprising a two-part clip with each part having a base and a leg depending therefrom, each of said legs having an inner surface with a recess therein shaped complementary to an outer link of the associated articulated roller chain conveyor, each of said legs having a socket in said recess for receiving the outer end of an associated connecting pin, each of said bases having an aperture therein extending in a direction substantially normal to the associated leg, and a rod extending into the aligned apertures and outwardly from said bases to provide a support surface, said rod snugly fitting in said apertures and frictionally maintaining said bases together with said legs in engagement with the associated connecting pin, a plurality of said assemblies mounted on the roller chain providing a conveying surface for transporting articles.

\* \* \* \* \*